United States Patent
Houvener et al.

[19]

[11] Patent Number: 5,832,464
[45] Date of Patent: Nov. 3, 1998

[54] SYSTEM AND METHOD FOR EFFICIENTLY PROCESSING PAYMENTS VIA CHECK AND ELECTRONIC FUNDS TRANSFER

[75] Inventors: Robert C. Houvener, Nashua; Ian P. Hoenisch, Salem, both of N.H.

[73] Assignee: Image Data, LLC, Nashua, N.H.

[21] Appl. No.: 700,815

[22] Filed: Aug. 21, 1996

Related U.S. Application Data

[63] Continuation-in-part of Ser. No. 436,146, May 8, 1995, Pat. No. 5,657,389.

[51] Int. Cl.⁶ .................................................. G06F 17/60
[52] U.S. Cl. .............................. 705/45; 235/379; 902/3; 902/5
[58] Field of Search ................................. 235/375, 379, 235/380; 364/400; 705/1, 40, 44, 45; 902/3, 5

[56] References Cited

U.S. PATENT DOCUMENTS

| | | | |
|---|---|---|---|
| 3,569,619 | 3/1971 | Simjian | 178/6.8 |
| 3,711,833 | 1/1973 | Starkey | 340/149 |
| 4,156,911 | 5/1979 | Crane et al. | 235/431 |
| 4,672,377 | 6/1987 | Murphy et al. | 235/375 X |
| 4,858,121 | 8/1989 | Barber et al. | 364/406 |
| 4,991,205 | 2/1991 | Lemelson | 380/5 |
| 4,993,068 | 2/1991 | Piosenka et al. | 380/23 |
| 4,995,081 | 2/1991 | Leighton et al. | 380/23 |
| 5,053,608 | 10/1991 | Senanayake | 235/380 |
| 5,095,196 | 3/1992 | Miyata | 235/382 |
| 5,131,038 | 7/1992 | Puhl et al. | 380/23 |
| 5,224,173 | 6/1993 | Kuhns et al. | 382/24 |
| 5,259,025 | 11/1993 | Monroe et al. | 380/23 |
| 5,321,751 | 6/1994 | Ray et al. | 380/23 |
| 5,337,358 | 8/1994 | Axelrod et al. | 380/23 |
| 5,416,306 | 5/1995 | Imahata | 235/380 |
| 5,436,970 | 7/1995 | Ray et al. | 380/23 |
| 5,466,918 | 11/1995 | Ray et al. | 235/380 |
| 5,602,933 | 2/1997 | Blackwell et al. | 902/5 X |
| 5,613,012 | 3/1997 | Hoffman et al. | 235/380 X |
| 5,657,389 | 8/1997 | Houvener | 380/23 |
| 5,679,938 | 10/1997 | Templeton et al. | 235/379 |
| 5,781,654 | 7/1998 | Carney | 382/137 |

*Primary Examiner*—Edward R. Cosimano
*Attorney, Agent, or Firm*—Bourque & Associates P.A.

[57] ABSTRACT

The present invention relates to the field of identity verification. Specifically, the invention is directed to a device and method for facilitating signature-less financial transactions as an improvement over common, prior art check-based financial transactions. This system and method provides the ability to use a check as a form of payment at a point of use without having to use the signed check as the binding document that is processed through the financial system to obtain payment by the entity rendering the service. The system and method comprises reading a hardcopy check via an electronic scanner, correlating the account number to a biometric or other piece of data that would positively identify the person tendering the check and using the biometric or other data to confirm the identity of the person tendering the check. This data is then associated with an auditable record of the person who performed the biometric or other data comparison. Once a particular financial transaction is authorized, the check is returned to the tenderer and the financial transaction is processed as an electronic fund transfer (EFT).

19 Claims, 7 Drawing Sheets

SYSTEM AND METHOD FOR EFFICIENTLY PROCESSING PAYMENTS VIA CHECK AND ELECTRONIC FUNDS TRANSFER

RELATED APPLICATION

This is a Continuation-in-Part of application Ser. No. 08/436,146, filed May 8, 1995, now U.S. Pat. No. 5,657,389.

FIELD OF THE INVENTION

The present invention relates to the field of identity verification. Specifically, the invention is directed to a device and method for facilitating signature-less financial transactions as an improvement over common, prior art check-based financial transactions. This system and method provides the ability to use a check as a form of payment at a point of use without having to use the signed check as the binding document that is processed through the financial system to obtain payment by the entity rendering the service. The system and method comprises reading a hardcopy check via an electronic scanner, correlating the account number to a biometric or other piece of data that would positively identify the person tendering the check and using the biometric or other data to confirm the identity of the person tendering the check. This data is then associated with an auditable record of the person who performed the biometric or other data comparison. Once a particular financial transaction is authorized, the check is returned to the tenderer and the financial transaction is processed as an electronic fund transfer (EFT). The disclosed invention reduces the opportunity for individuals to commit fraud since positive identification is made of the person tendering a particular check. The invention also significantly reduces the cost of accepting a check as a form of payment since the invention eliminates the need to process a physical piece of paper (a check) through the financial system, which includes the retailer, the Federal Reserve and local banks.

BACKGROUND OF THE INVENTION

Positive identity verification is critical in many types of transactions and security procedures. For example, signatures, fingerprints or images of faces are compared to establish identity. Creation of fraudulent identities or the misrepresentation of an individual's identity can result in fraudulent transactions and the breach of security systems. At present, such positive identification means as drivers' licenses, picture identification cards, hand-written signatures, personal identification numbers, fingerprints, retinal scans, voice prints and other ways of uniquely identifying personal characteristics are used. However, these prior art methods of identity verification exhibit one or more of the following characteristics: 1) they do not offer sufficient reliability for most positive personal identification applications; 2) the technology required for their implementation is too expensive for wholesale adoption by entire industries; 3) they do not offer ease of use, which is critical for most applications of personal identification; 4) the technology required to implement them in a wide-scale manner is not yet mature enough to guarantee sufficient reliability; 5) cost of using the technology is too high for most applications of personal identification; 6) the data used for identity verification is not maintained in a secure manner and is almost universally held by the person presenting it as the form of verification, thereby allowing for fraudulent alteration of the verification data; 7) processes for building accurate verification databases for wide-spread use are impractical; 8) the process of verification does not include sufficient steps to ensure that the individual responsible for identity verification is accountable to ensure that identity verification is accurately performed; and finally, 9) the process of identification does not lend itself to providing an auditable trail of transactions.

One system which relies on positive identity verification for transactions is the credit/debit and charge card system. Credit cards are an increasingly popular means for consumers to complete transactions. However, part of the costs incurred from the convenience of using credit cards is the burgeoning growth of credit card fraud. Because there are trillions of dollars of credit card transactions made each year, which depend on the fact that the person presenting the form of payment is actually the person having the legal right to use the underlying account, even a small percentage of fraudulent transactions results in billions of lost dollars. The cost of this fraud is paid for, indirectly, by the consumers in the form of higher credit card interest rates and fees and, in part, by the merchants accepting such credit cards in the form of higher transaction commissions.

Methods used to combat fraud have been the use of holographic images on cards, the need for a validation requester to obtain transaction approval, the encoding of cardholder information on magnetic strips on the back of the card, as well as signature verification. A number of patents have issued on identification devices and methods. Of particular note is U.S. Pat. No. 5,321,751, issued to Ray, et al. on Jun. 14, 1994. Other prior art references of note are U.S. Pat. No. 5,337,358, issued to Axelrod, et al. on Aug. 9, 1994, U.S. Pat. No. 5,095,196, issued to Miyata on Mar. 10, 1992, U.S. Pat. No. 5,259,025, issued to Monroe, et al. on Nov. 2, 1993, U.S. Pat. No. 4,995,081, issued to Leighton, et al. on Feb. 19, 1991, U.S. Pat. No. 4,991,205, issued Lemelson on Feb. 5, 1991, U.S. Pat. No. 5,053,608, issued to Senanayake on Oct. 1, 1991, U.S.. Pat. No. 5,131,038, issued to Puhl, et al. on Jul. 14, 1992 and U.S. Pat. No. 4,993,068, issued to Piosenka, et al. on Feb. 12, 1991. As noted above, one of the underlying deficiencies of all of these prior art identification systems is that they all rely, in some manner, on information encoded on the credit card being presented. While some of these references include sophisticated encryption algorithms, the fact remains that giving access to the information to the card users lends itself to the potential for reverse engineering and overcoming even the most sophisticated of encryption means.

In the recent past, Citibank introduced a credit card with a digital likeness of the authorized user provided on the card itself. As the Ray patent discloses, the photographic image on the Citibank card resulted in an initial drop in fraud in the New York test market estimated as high as 67 percent. However, as Ray also explains, the Citibank photo card system, like other forms of identity verification that are distributed to the public will eventually be defeated by sophisticated counterfeiting.

An additional difficulty with most prior art verification methods is that they all require the use of a special credit card incorporating some form of identification means. Thus, in order for their use to gain widespread acceptance, replacement of existing credit cards and credit card manufacturing equipment must be accomplished.

Much like the use of the credit card system, the checking system relies upon the identity of the person tendering a check as the form of payment for a particular financial transaction. The current state of the art in verifying the identity of a person tendering a check is for a store clerk, or other person accepting a check as a form of payment, to require the person tendering the check to produce an independent form of identification. The most common form of identification required is an individual's driver's license. Although driver's licenses, which are issued by government bodies, are becoming ever more difficult to forge, any form of identification which is held by a person to be identified provides the opportunity for sophisticated criminals to create and/or modify.

The disclosed invention offers a number of advances over prior art identity verification systems and methods, which overcome many of the limitations found in such prior art systems. The first, and perhaps the most significant advantage of the disclosed invention is that the positive identity verification system stores the verification data at a remote site and thereby does not give criminals access to the identity verification medium. This is significant in that any time a potential counterfeiter is afforded the opportunity to access the verification medium, there is the potential that the medium can be corrupted, regardless of the level of security sophistication incorporated into the system. A second, and again significant advantage of the disclosed invention is that the system is completely independent of the credit cards whose users the system is designed to positively identify. Thus, the disclosed invention does not require the modification or replacement of existing credit cards, which would be an almost insurmountable task. Furthermore, the segregation of the identity verification medium from the credit cards themselves allows the system disclosed herein to be used in conjunction with any number of credit cards.

Additionally, low cost disposable cameras and access to drivers' license databases, which are maintained by all of the states, makes wide-scale implementation of the system and method convenient and cost effective. Finally, having an interface to credit authorization agencies resident at the remote database location reduces the hardware needed at the point of verification as well as at the remote database locations, thereby reducing the costs of the overall verification service.

OBJECTS OF THE INVENTION

Accordingly, it is an object of the present invention to provide a system and method of positive identity verification for use in conjunction with transactions where ensuring the identity of persons is important, such as credit card or check-based financial transactions, that separates the identification medium from the credit card or check user.

Another object of the invention is to provide a positive identity verification system and method which is difficult to counterfeit.

Yet another object of the invention is to provide a system and method for positive identity verification that includes a secure and accurate database of photographic images of individuals and other pertinent data, such as digitized graphical representations of signatures, that can be accessed for multiple positive identification uses.

Still another object of the invention is to provide a system and method of positive identity verification that removes the form of identification from the credit card or the like so that existing credit cards do not need to be replaced in order to implement the device and method.

Yet another object of the invention is to provide a system and method of positive identity verification that removes the requirement for personal signatures from credit cards or the like so that signature forgery is virtually impossible when a credit card is stolen and fraudulently used.

A further object of the invention is to provide a system and method of positive identification that requires accountability on the part of the person verifying that the physical characteristics of the person to be identified match the image of the person that is stored in the system's image database.

A further object still of this invention is to provide a virtually uncounterfeitable system and method for positive identity verification.

Yet another object of this invention is to provide a system and method for efficiently processing check-based financial transactions without the need for processing paper checks through the financial infrastructure.

These and still other objects of the disclosed invention will become apparent from the following description.

SUMMARY OF THE INVENTION

The present invention is a system and method of efficiently processing checkinitiated financial transactions via electronic funds transfer. The system comprises at least one remote correlation database site having stored therein a database comprising a plurality of identifying information units. At least one of the identifying information units corresponds to an authorized user of a particular checking account. In the preferred embodiment, the identifying information units take the form of the names and addresses of authorized users of a particular checking account. In another embodiment, the names and addresses are augmented by a digital photographic image of each authorized user of a particular checking account. The system includes a point of identification terminal, which includes a means for scanning data off of a check and a means for displaying at least one of the identifying information units for viewing and selection by a store clerk or other person accepting a check for payment in a financial transaction. When a checking account number is read by the terminal, communications are established between the terminal and the remote correlation database where the account information is correlated to at least one identifying information unit unique to at least one authorized user of the account. The database would then transmit the correlated identifying information unit to the terminal where the store clerk would verify it against a like identifying information unit presented by the person tendering the check as the payment medium. Account, payment and identifying information for each transaction is stored as a transaction record by the remote database for later retrieval should a particular check-initiated electronic funds transfer financial transaction fail.

BRIEF DESCRIPTION OF THE DRAWINGS

FIG. 2 is a perspective view of the preferred embodiment of the point of identity terminal, which would be available for use at a point of sale or the like.

DETAILED DESCRIPTION OF THE INVENTION

The present invention is a system and method to develop, maintain and use a secure and authentic database of digital photographic image, signature or other data unique to individuals for positive identity verification purposes. The system includes a means for accessing the database in a secure and cost-effective manner, a means for performing positive identity verification, and a distributed database update and retrieval system, which allows for low cost operation, ease of use, stability and robustness for vast numbers of verification requests originating from worldwide locations. The present invention also includes a means that allows for accountability on the part of the user of the system, which in turn will ensure that the system is used to its fullest potential.

One such system that will be disclosed herein contains particular references to a point of sale system, where a credit card is presented by a consumer, or presenter, in order to make a purchase. Thus, the system will make particular references to credit card account numbers, and the like. However, it is understood that the positive identity verification system disclosed herein is adaptable to any application where positive identification of a person is required. Such alternative applications comprise checking and banking transactions, which will be discussed in detail hereinafter, firearm sales, food stamp reimbursement and a host of other applications related to the welfare, voting, law enforcement, health care, airline, immigration and naturalization fields.

Figure 1:
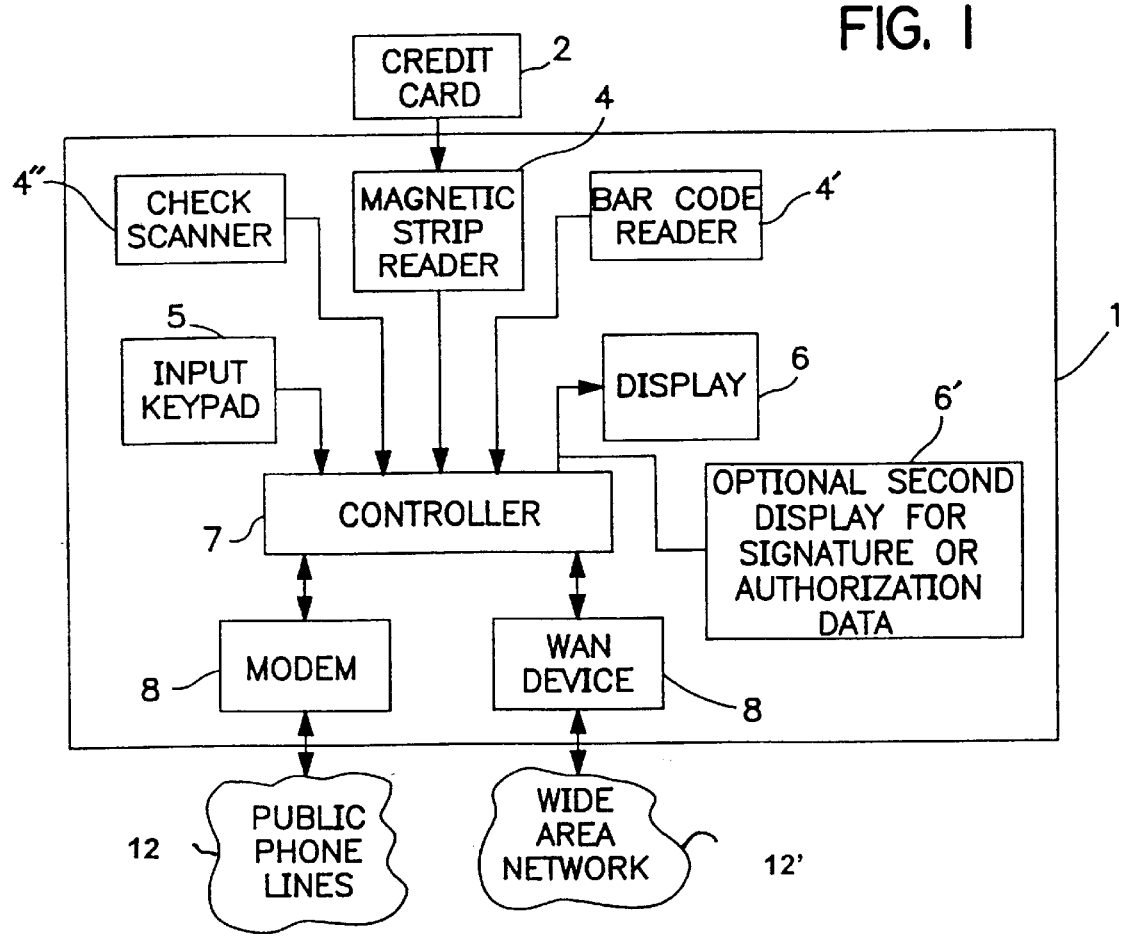
FIG. 1 is a block diagram of the point of identity verification terminal showing the various components contained therein.
Figure 2:
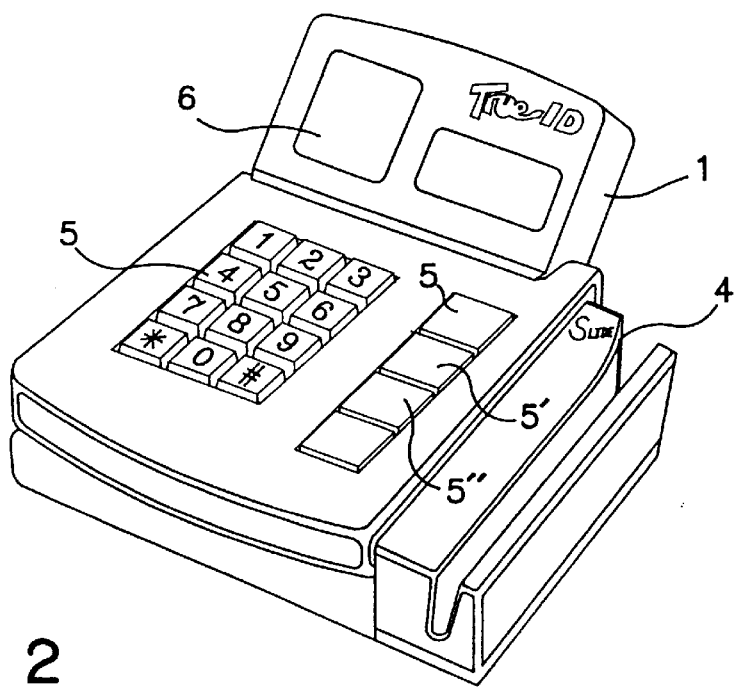

Referring now to the figures, and in particular, FIGS. 1 and 2, a positive identification system in accordance with the disclosed invention is shown. A point of identification terminal 1 is located at a location where the identity of persons present is required to be verified. The point of identification terminal comprises a standard magnetic strip reader 4, an optional bar code reader 4', a check scanner 4", all of which are well known in the art, an input keypad 5, a display means 6, which is preferably a miniature flat panel display, a controller 7, and an internal communication modem or other communications means 8. Although the rate of data exchange may vary depending on the availability of quality phone lines or other means of data transmission, such as a dedicated wide area network or a satellite communications link.

In a credit card transactional situation, the point of identification would be the point of sale, which typically incorporates a cash register and prior art credit card verification systems. Upon presentation of a standard credit card 2, the store clerk or other individual responsible for positive identification would input the credit card account number into the point of identification terminal 1. The preferred method of inputting the credit card information would be by swiping the credit card through the standard magnetic strip reader 4, which would be capable of reading credit card account information, which is currently encoded on magnetic strips on the reverse side of virtually all credit cards. In the alternative, if the magnetic strip containing the account data is corrupted, which routinely occurs due to either wear or contact with a powerful magnetic field, the identifier would simply read the account number off of the credit card, where it is typically provided in embossed characters, and input the credit card account number into the point of identification terminal using keypad 5. Another alternate means of inputting the credit card account information into the point of identification terminal would be to utilize a coded medium such as a bar code. In this embodiment, the magnetic strip reader 4 would be replaced by a standard bar code reader 4' to transfer its data to the bar code reader 4' and onto controller 7. Another embodiment of the invention would include check scanner 4", which would be used to scan checking account number information off of a standard personal or company check, which would expand the role of the system from credit/debit card transaction identity verification to checking related transactions as well.

In addition to the credit card account information, the identifier could manually input any other information needed to aide in the identity verification process via keypad 5. Such additional information could be whether the presenter is male or female, in which case the keypad could incorporate a specific key to correspond to the male—female choice 5' or whether the presenter is a dependent of the credit card owner, in which case the keypad would incorporate a specific key 5" to correspond to dependent choice.

Figure 3:
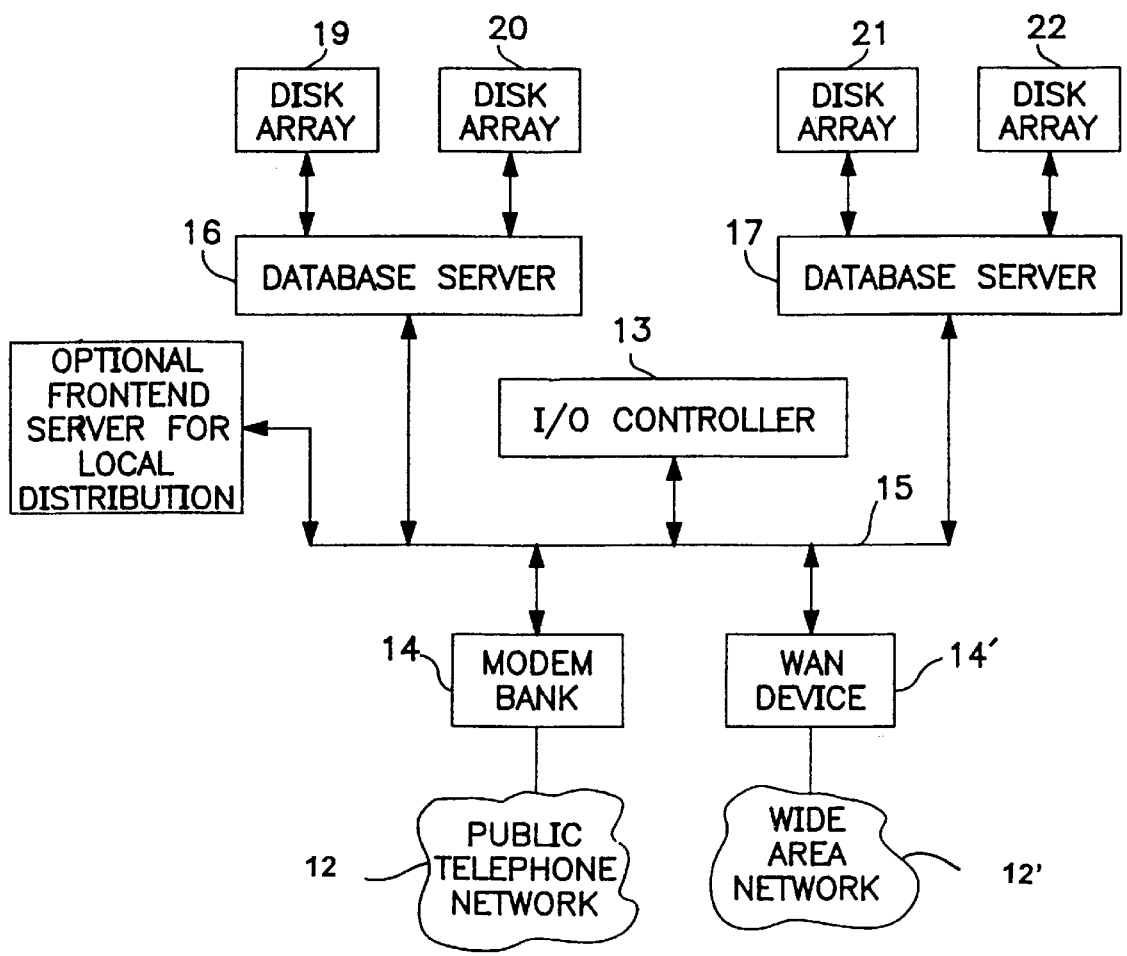
FIG. 3 is a block diagram of components of the positive identity verification system and the communication flow path established between the point of identity verification and the remote database storage and retrieval center, which is where a comprehensive database of photographic images of persons to be identified is maintained and accessed for transmission to the point of verification.

Once the account number is entered into the point of identification terminal 1, the terminal would initiate communications via its internal communication means, which could be a modem or wide area network (WAN) device to one of a number of remote database storage sites 9–11 using public phone lines 12 or wide area network 12'. Alternative forms of communications links are envisioned as well, and include satellite communications, or dedicated network means. The actual site accessed would be a function of availability and loading on the public access phone lines, network availability, retrieval site availability or other system availability criteria at the time the terminal initiates as shown in FIG. 3, communications with a remote database site. Communications will then be established with an input/output controller 13 at the remote database storage site through a modem bank 14 at the database storage site, the controller 13 would initiate a query to the point of identification terminal 1 to verify that the terminal has the appropriate authority to access the remote database site and is a valid device. One simple and cost effective method of performing this query is to use commonly available caller ID technology to ensure that the request for data has been originated from an authorized telephone line. Additionally, a software key may be incorporated into each point of identification terminal which will respond in a predetermined manner when queried by a remote database storage site.

Once controller 13 verifies that the requesting point of identification terminal 1 is a valid device and has the appropriate access privilege, the terminal will be allowed to transmit an information request to the database storage site. The information request is also received by input/output controller 14, over a high speed network 15. The high speed network may be fiber distributed data interface (FDDI), asynchronous transfer mode (ATM) or any other suitable cost effective high speed network. The information request is then routed to one of a number of database servers 16–17 where the credit card account data is processed. The selected server then accesses a set of high speed, high reliability disk arrays 19–22 and retrieves the digital photographic or other image or other unique personal data associated with the account data received by the database server. An optional front end server 23 may also be provided in communication with the high speed network 15 for local distribution.

In addition to retrieving the digital image or other unique personal data stored at the remote database site, the database site would be configured to allow input/output controller 13 to initiate additional information requests from outside information databases. One such scenario envisioned in the credit card processing example would be for the database site to query any one of a number of existing credit authorization agencies (CAA) to verify that the credit card account being processed is valid and within its pre-approved credit limit. An alternate embodiment would be to have the remote database storage and retrieval site(s) co-located at a one or more CAA sites.

The identifier, which would be the sales clerk in a retail establishment, would only need to input the credit card information into one device and would receive both credit approval and identity verification from a single source. In this scenario, input/output controller 13 would initiate a credit authorization request to an outside CAA through modem bank 14 over public access telephone lines 12 or through a WAN connection 14' or the like. If the amount of the transaction is approved by the CAA the database site would receive the credit approval code from the CAA and retransmit the code to the point of identification terminal along with the digital image information or other unique data over its established communications link. The credit approval code would be displayed either on the display means 6 of the point of identification terminal or, in the alternative, on an optional second display means 6'.

The point of identification terminal 1 would then receive the information via modem or WAN connection 8 and route it to controller 7, which would process the information received and display the digital image received on either display means 6. In one embodiment of the invention, the digital information would be stored at the remote database storage site in a compressed state and be transmitted to the point of identification terminal in the compressed state so as to minimize the time associated with a particular transaction. In this embodiment, the controller 7 would first decompress the digital photographic information and then display the information on display means 6.

Another embodiment of the invention, which would be used for situations where the highest security of information would be required, the digital image information would be encrypted in addition to being compressed while it is being transmitted to a point of identification terminal. In this embodiment, the terminal controller 7 would be required to decrypt as well as decompress the photographic information in order to allow the information to be displayed on the display means.

The store clerk, or other person responsible for identity verification would then visually compare the image displayed on the display means with the physical appearance or the signature of the person presenting the credit card at the point of identification. If a match exists, then the clerk would input a specified keystroke sequence on input keypad 5 to indicate that the clerk has in fact verified that an identity match exists. The keystroke sequence would be unique to an individual clerk much like a personal identification number (PIN). The individual PIN would then be transmitted by the point of identification terminal via the communications link to the remote database storage and retrieval site, where the PIN would be associated with the particular transaction being completed and stored for retrieval at a later date should a dispute arise as to whether or not a particular credit card transaction was properly authorized. Thus, the use of a PIN-type system associated with each store clerk would provide accountability and result in a higher level of scrutiny than a system that does not incorporate any features to ensure personal accountability.

Other features that could be added to the basic system include the addition of signature verification capability. Because signatures, as well as photographs, can be digitized and transmitted over a standard communications medium, signature verification would be a natural extension of the basic system. In this embodiment, a digital, graphical representation of a signature would be transmitted to the point of identification terminal from the remote database site at the same time the photographic data is transmitted. In this embodiment, the identifier would be able to display either the photographic image of the presenter or the presenter's digital signature on the display means 6 in order to verify either one or both forms of digital information. In an alternate embodiment, second display means 6' would be used to display an authorized digitized signature at the same time a photographic image of an authorized user is displayed on display means 6. This additional feature would allow participants of the system to maintain signatureless credit cards. Thus, if a criminal were to obtain a credit card, the card would have no signature for the criminal to study and possibly learn to forge. This would add an additional level of security to the system, not found in the basic system.

In an another embodiment of the basic invention, a retrofit terminal is used to add positive identity verification to existing point of sale credit card authorization devices and systems. The retrofit terminal is designed to work in conjunction with existing point of sale devices without the necessity of replacing currently existing retail establishment hardware systems.

The retrofit terminal is added at the existing point of sale and consists of a modified controller, a display means, and a communications interface. Preferably, the display means is a miniature flat panel display, similar to the type used in the point of identification terminal 1 described above. The display 6 can be located on available counter space or, if space is at a premium, it can be mounted on a pedestal or the like. The retrofit terminal would be connected to a standard power source and to the existing credit card authorization hardware via its internal serial or parallel communications interface.

The retrofit terminal would require the use of a modified controller. Instead of accepting the credit card account information from either a magnetic strip reader 4, a bar code reader 4', or a manual keypad 5, as is the case with the standard point of identification terminal 1, the retrofit terminal would accept the credit card account information from the existing credit card authorization hardware via its communications interface. The retrofit terminal would then initiate communications to a remote database site in the same manner described earlier in order to retrieve and display identifying data, such as digitized photographs or signatures of the authorized credit card users. However, unlike the standard point of identification terminal, identifier accountability would have to be provided using inputs entered by the identifier on the existing credit card authorization hardware, or through the input of an access authority information unit, such as a unique memorized or electronic key implemented PIN through the retrofit terminal. In addition, the retrofit terminal could be configured to display a biometric identifier of each identifier authorized to access the remote database, which would itself be verified by a supervisor or the like upon initial sign on to the system by an identifier. The retrofit terminal would then forward the identifier specific information to the remote database site for storage. The retrofit terminal could also include an optional check scanner or an optional bar code reader to allow for flexibility of use with other forms of payment such as personal or company checks or the like.

Thus, the retrofit terminal would greatly reduce the cost per verification site, would simplify the installation of hardware at each verification site, and would increase the viability and acceptability of the novel positive identification system.

Figure 4:
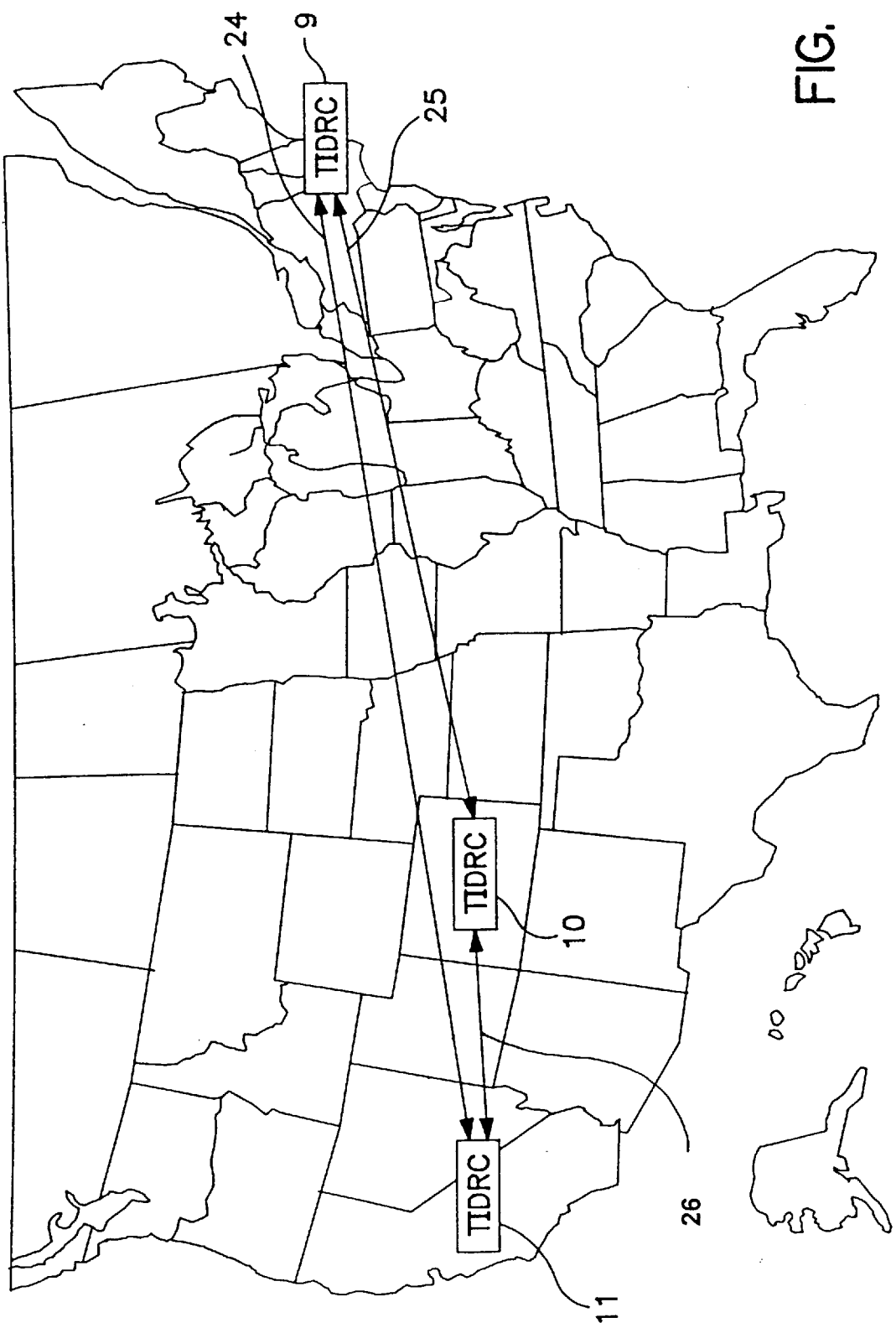
FIG. 4 is an upper level system architecture drawing showing a number of database storage and retrieval centers networked over a global high speed network.

Multiple remote database storage and retrieval centers 9–11 (FIG. 4) would be tied together via a global high speed network 24–26. Data from any of the database centers can be routed to any of the other centers over the network in order to update the databases, provide redundancy of data, emergency backup, load monitoring and transactional balancing.

Because the disclosed invention can be used without alteration of any substantial kind to the present credit card system, as seen from the perspective of a current credit card user, novel methods will be used to develop the digital photographic image database. One such means of compiling the database would be through the use of disposable cameras, which would be sent to credit card users indicating a desire to participate in the positive identity verification system. The means by which this type of photographic image gathering would lend itself to a high level of security and would thus minimize the amount of fraud that would be associated with the system.

First, an individual wishing to participate in the system would submit a request to the database provider. In the alternative, a credit card provider could include an application request in its monthly billing statement to all its credit card customers. The request to participate would be in the form of an application form, which would request personal information of the participant, including, name, address, and the existing credit card accounts that the participant would want to use in conjunction with the positive identification system. The database provider would then assign a unique code to each application and would send a disposable camera to the address listed on the application. The code would preferably take the form of a bar code, which would be more easily machine read by the database provided to allow for a high degree of automation in the development of the database.

Once the participant receives the camera from the database provider, he or she would follow the enclosed directions and have a friend or family member take at least one photograph of the participant with the camera. The camera would preferably have sufficient film to ensure that at least one acceptable photograph of the participant is taken and forwarded to the database provider. However, to minimize the cost associated with the provision of cameras, they would not necessarily include a standard 12 exposure roll of film. Once the photographs are taken, the participant would send the camera via the mail to the database provider. The provider would then develop the film and digitize at least one of the photographic images of the participant. The database provider would then correlate the digital image with the proper participant data using the bar code or other identifying means associated with the particular camera.

In this way, it would be virtually impossible for a counterfeiter to defeat the system. Also, by disassociating the event of providing the applicant information from the event of providing the applicant's photographic image, fraud will be reduced. However, even if a counterfeiter were to intercept a camera, he or she would have to send his or her picture to the database company in order to defeat the system. This would not be an acceptable scenario since the database provider would then have an accurate image of the "would be criminal", which could be provided to the appropriate authorities in the event that fraud is perpetrated.

An alternative form of database development that has been contemplated by the inventor is through the acquisition of digital photographic data of individuals already maintained by other entities. One such alternative source of photographic data is through the Departments of Motor Vehicles (DMV's) of the various states. At present, most states issue driver's licenses to residents, which not only include certain biographical data of drivers, such as name, address, date of birth, social security number, and the like but they also include a photograph of the individual licensee. The DMV's retain for their use all of the biographical data of the licensees, including a duplicate of photographs that appears on the drivers licenses. These photographs, which are retained by the various DMV's can be digitized using a standard technology digital scanner and stored in a format compatible with the positive identity verification system.

Verifying the accuracy of these DMV photograph s would require a slightly different procedure than previously described for obtaining digital photographic data using disposable camera technology. In the DMV-based scenario, the database provider would obtain and store the entire photo database from a particular state in a separate, state specific source database. The database provider or any credit card company could send participation requests to those individuals resident in a state whose DMV database has been included in the provider's master database. Upon receipt of a participation request, the database provider would forward a digital photograph of the requesting individual for verification that the requesting party with a return form or the like to indicate that the photograph is an accurate representation of the appearance of the requesting party. Once the database provider has received confirmation of the accuracy of the photograph, it would transfer the specific photo from the state specific source database to the genera l database. The same scenario would work with digital representations of signatures as well.

Figure 5:
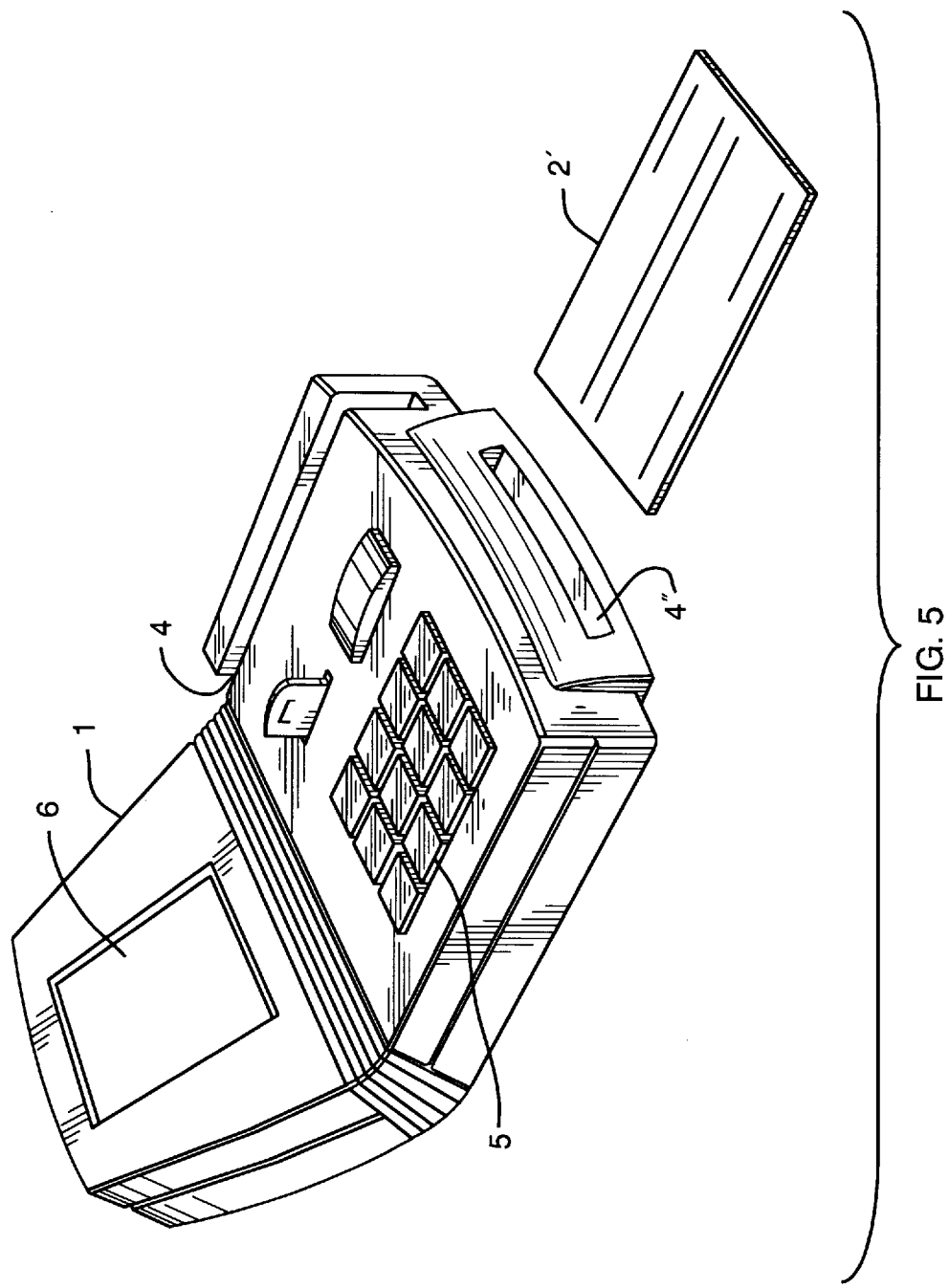
FIG. 5 is a perspective view of one preferred embodiment of a point of identification terminal, which is especially configured to read data off of checks and convert the same into a check-less electronic fund transfer (EFT) transaction.

Another embodiment of the invention comprises a system and method of efficiently processing payments via check and electronic funds transfers. Turning now to FIG. 5, this embodiment requires the use of a point of identification terminal 1, which includes check scanner 4". The system would operate much like that described above for individual financial transactions using credit cards, except that a personal or company check 2' would be tendered at a point of sale as the method of payment. When a check 2' is tendered as the method of payment, the store clerk would process the check by inserting it into the check scanner 4" of point of identification terminal 1. Check scanner would read the account data off of the check, which is included on all valid checks in a standardized format, including standard character types and placement. In addition to reading the account number, check scanner 4" would also scan any personal data off of the check. Such personal data is generally presented in the upper left hand corner of checks. Although this data may be presented in varying formats, including different fonts, sizes or order of data, standard optical character recognition (OCR) techniques would be utilized by the point of identification terminal in order to allow for these types of variations to be acceptable to the system.

Figure 6:
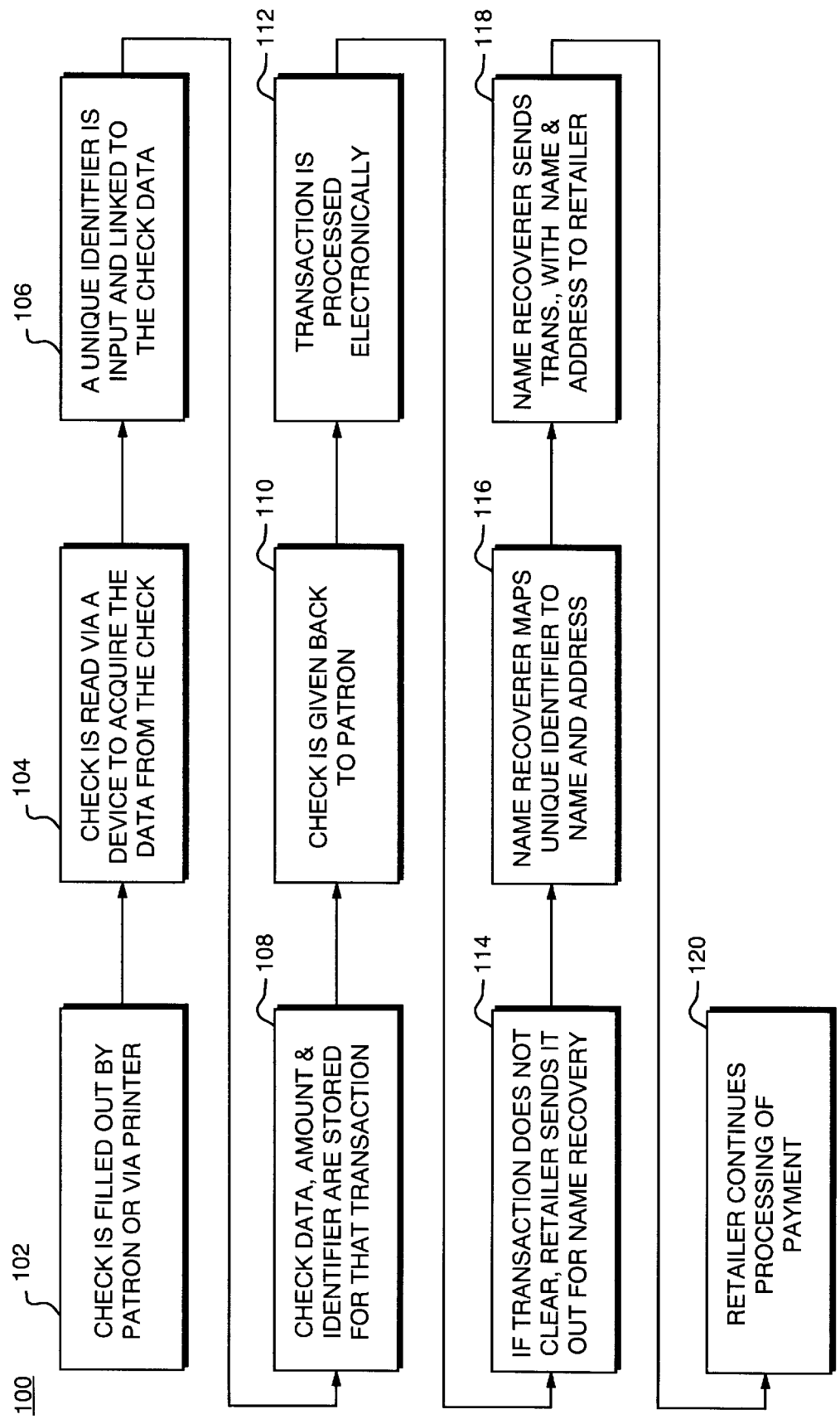
FIG. 6 is a block diagram showing the steps of the method of processing a check-based financial transaction via an EFT along with the steps taken should a particular EFT transaction fail.

Once a check is input into the system and the various data is read by the check scanner, the check would be returned to the person tendering such check as payment at the point of sale. At this point, the transaction would be converted to an electronic transaction for payment. The method of the current state of the art in check-initiated electronic funds transfer transactions is more specifically shown in FIG. 6.

This method 100 requires that a check be filled out by a patron either at the point of sale or in advance using handwriting and or other means of printing the required payment information, such as the identity of the payee and the amount of the payment, on the check (step 102). The checking account number would then be input into the system either manually or through the use of a scanning device (step 104). At this point, the clerk would require the patron to provide a unique identifier to the clerk to be linked to the checking account (step 106). The most common unique identifier required is a patron's driver's license number, which would be input into the system and linked to the checking account number. The checking account number, the dollar amount of the check and the unique identifier would then be stored by the system as a check transaction record (step 108). The check would then be returned to the patron (step 110). The system would then process the transaction electronically as a routine electronic fund transfer (EFT) (step 112).

So far, this type of check-initiated EFT transaction does not pose any problems to retailers or other merchants. However, if a particular check-initiated, EFT does not clear, the retailer would not be in possession of sufficient data to track down the particular patron who tendered the original check that resulted in the unprocessed or failed EFT. By not retaining the physical check, which would include the tenderer's name, address and other identifying data, the retailer would only have a checking account number and the amount of the failed EFT on hand. Thus, the retailer would be required to send the transaction out for name recovery by an independent agency (step 114). The name recoverer would then need to map the unique identifier to the name and address of the person tendering the check (step 116) and return the same to the retailer requesting the information (step 118). Only then would the retailer be in a position to continue the processing of the payment (step 120) by contacting the person who originally tendered the check and requesting an alternative form of payment.

As can be imagined, this process could be time consuming and costly to merchants. However, the disclosed invention would greatly simplify the entire check-initiated EFT payment transaction and virtually eliminate fraudulent check-initiated transactions.

Figure 7:
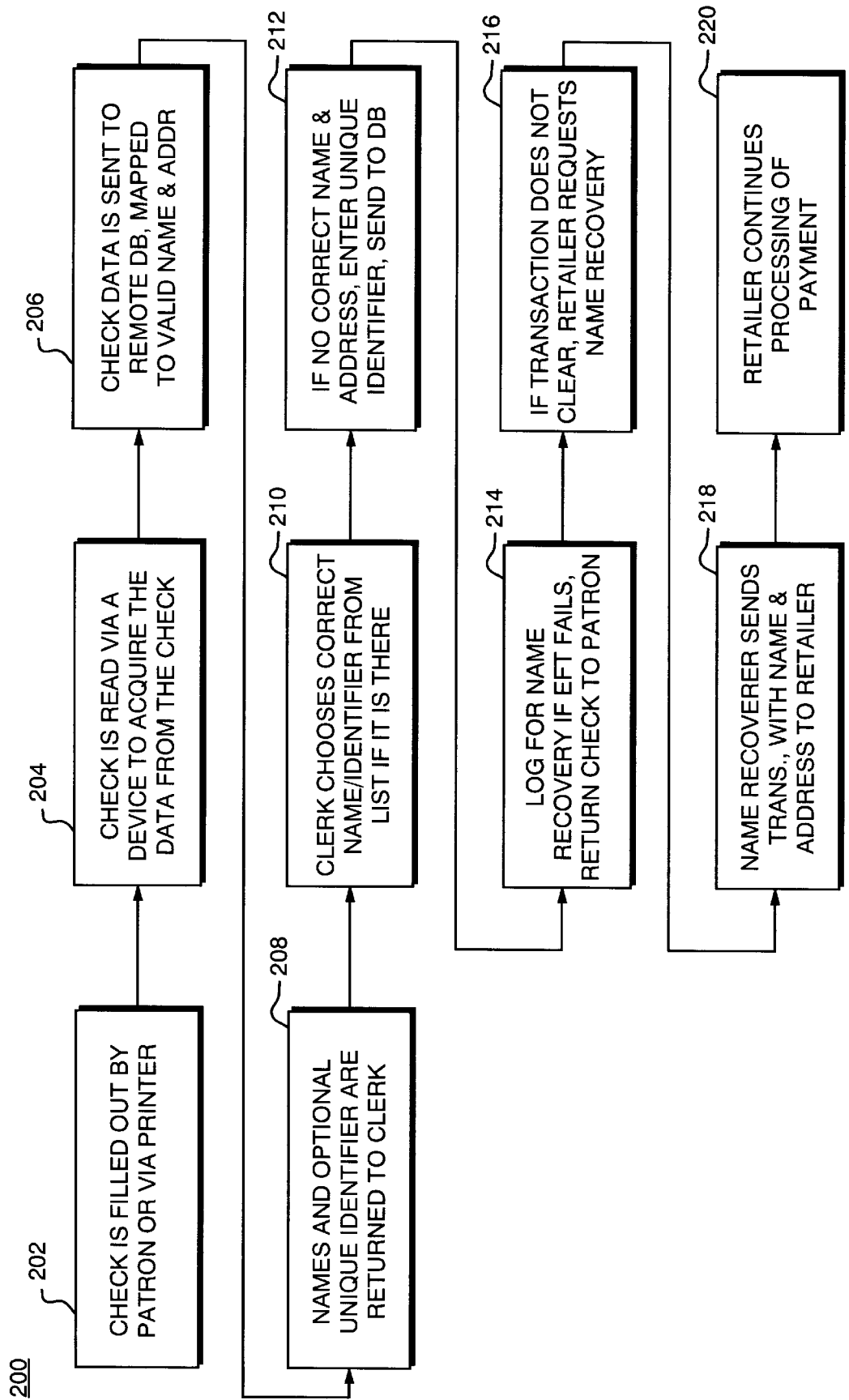
FIG. 7 is a block diagram showing the steps associated with a method of real-time data recovery from data presented on a check and the correlation of said data with data retained in a secure, remote database.

Turning now to FIG. 7, a real-time method of processing check-initiated EFTs, including a real-time method of data recovery and data correlation 200 is shown. In this method, as with the current state of the art, a check would be filled out by a patron at the point of sale or in advance using a printer (step 202). The check would then be tendered to a sales clerk at a point of sale location as the payment method for a particular financial transaction. The next step would be to scan the check using check scanner 4" in the point of identification terminal 1. The check scanner would thus obtain the relevant information necessary to convert the check-based transaction into an EFT, such as the checking account number, routing information and the like. However, at this point in the transaction, the disclosed system and method would depart from the current state of the art.

In addition to having the capability of reading the checking account and routing information off of the check, the disclosed system would include a check scanner capable of reading other printed information off the face of the check, such as name, address, etc (step 204). This may be done either using built-in OCR capabilities or through the use of bit map or other imaging techniques, which could capture an image of a particular check, convert the same into an electronic file, which would then be communicated to the remote database site where it would be resolved using remote OCR technologies resident at the remote database site. In any event, once the account information and other identifying data is read by the check scanner, the point of identification terminal would initiate communications with the secure, remote database described earlier with respect to credit card transactions. Once communications are established, the point of identification terminal would query the remote database and request that the account data be mapped to one or more valid names and addresses authorized to use the checking account in question (step 206). The correlation would be accomplished at the remote database and a name, or list of names, would be returned to the clerk at the point of sale (step 208). Optionally, the database could send at least one unique identifier for each authorized user of a particular checking account to the point of sale for redundancy of identification purposes. The clerk would then scan the information received at the point of sale and choose the correct name and/or identifier from the list if it is included therein (step 210). The choice selected by the clerk would then be transmitted back to the remote database where it would be logged along with the other transaction information as an EFT transaction record (step 214). If a particular EFT fails, then the EFT transaction record would be available for recovery by the retailer or other merchant so that the patron initiating the check-based transaction can be located by the retailer so that the retailer can contact said patron in order to continue the processing of the payment (steps 216,218 and 220).

If no correct names and addresses are provided to the point of sale by the remote database, the system would instruct the clerk to request that the person presenting the check provide the clerk with a unique identifier, such as his or her driver's license. The clerk would then enter the unique identifier associated with the person using the account into the point of identification terminal, which would, in turn, transmit the same to the remote database for storage and future correlation purposes (step 212).

Figure 8:
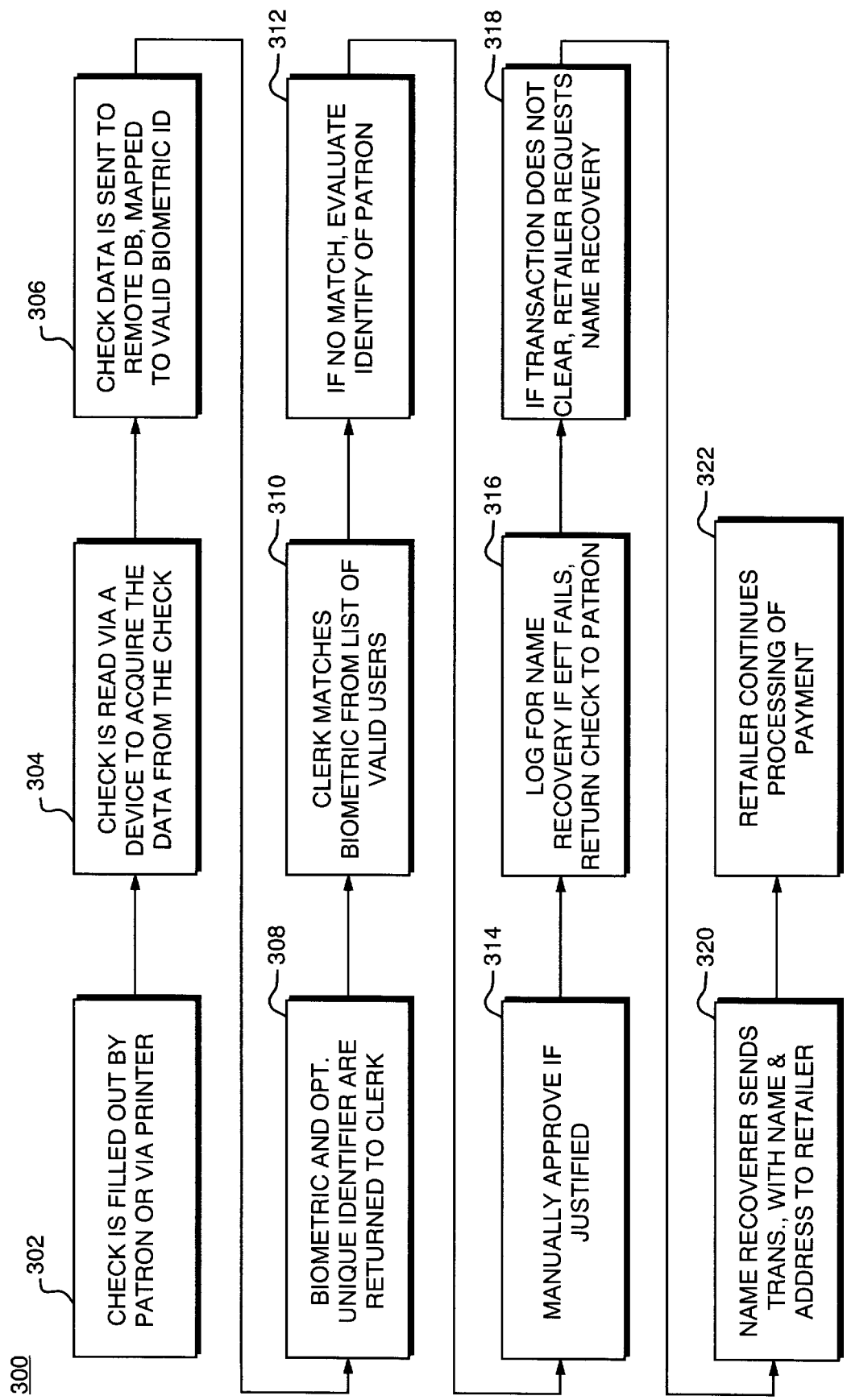
FIG. 8 is a block diagram showing the steps associated with a method of real-time biometric identification and the ability for future data recovery from a secure, remote correlation database.

An even more robust method 300 of real-time check-initiated EFT payment processing is shown in FIG. 8. This method 300 includes real-time biometric identification and the ability for future data recovery from the secure, remote correlation database. In this method, a check is presented by a patron and is scanned by the check scanner at the point of identification terminal as described above (steps 302 and 304). The checking account data is then transmitted to the remote database, where it is mapped to at least one authorized user of the particular checking account (step 306). However, in addition to providing the names, addresses and other character-based unique identifiers for the authorized users of a specific account, the remote database would include a database of valid biometric identifiers of those authorized users as well. The preferred biometric identifier stored in the remote database is a digital image of each authorized user.

Thus, when the remote database maps a particular account to a list of authorized users, it not only provides the list of names and addresses to the clerk at the point of identification terminal but it also provides the clerk with the biometric identifiers associated with those users (step 308). In the case of the digital photographs of the authorized users of an account, each one may be displayed on the display means 6 of the point of identification terminal 1. The clerk would then scroll through the sequence of digital images until an image is displayed that matches the physical biometrics observed by the clerk at the point of identification (step 310). When the clerk matches the biometric data, then a key sequence is entered to indicate that the clerk has verified the identity of the patron. The system would then log the transaction and biometric data for later retrieval if required in a manner similar to the method described above with respect to FIG. 7 (step 316). If a transaction does not clear, then the retailer would request name recovery from the database provider (step 318) who would retrieve the same and return it to the retailer (step 320). The retailer would then continue the processing of the payment (step 322).

If no match exists, then the clerk would be required to evaluate the identity of the person at the point of identification using prior art practices, such as examining the individual's driver's license, passport, or other unique identifying data. The clerk would then manually approve the transaction if justified.

Various changes coming within the spirit of the invention may suggest themselves to those skilled in the art; hence the invention is not limited to the specific embodiment shown or described, but the same is intended to be merely exemplary. It should be understood that numerous other modifications and embodiments can be devised by those skilled in the art that will fall within the spirit and scope of the principles of the invention.

What is claimed is:

1. A system for correlating, storing and retrieving identifying information and financial information to facilitate the processing check-initiated financial transactions via electronic funds transfer comprising:

at least one remote correlation database site having stored therein a database comprising a plurality of identifying information units, wherein at least one of said identifying information units corresponds to an authorized user of a checking account;

a point of identification terminal having a means for scanning data off of a check and a means for displaying at least one of said identifying information units;

a means of communicating between said point of identification terminal and said remote correlation database to interchange data between the two;

a means for correlating at least one identifying information unit to a checking account number;

a means for accepting identifier specific data at the point of identification terminal to verify that an identifier at the point of identification terminal has compared the identifying information unit displayed on the display means with physical information presented by the person to be identified and that a match exists between the two;

a storage means for storing said correlated identifying information unit, identifier specific data and checking account number as a checking transaction record; and a means for retrieving said transaction record.

2. The system for efficiently processing check-initiated financial transactions via electronic funds transfer as claimed in claim 1, wherein said identifying information unit comprises the name of an authorized user of said checking account.

3. The system for efficiently processing check-initiated financial transactions via electronic funds transfer as claimed in claim 1, wherein said identifying information unit comprises the address of an authorized user of said checking account.

4. The system for efficiently processing check-initiated financial transactions via electronic funds transfer as claimed in claim 1, wherein said identifying information unit comprises the name and address of an authorized user of said checking account.

5. The system for efficiently processing check-initiated financial transactions via electronic funds transfer as claimed in claim 1, wherein said identifying information unit further comprises a digital image of an authorized user of said checking account.

6. The system for efficiently processing check-initiated financial transactions via electronic funds transfer as claimed in claim 1 further comprising a means for verifying that said point of identification terminal is authorized to access said remote correlation database.

7. The system for efficiently processing check-initiated financial transactions via electronic funds transfer as claimed in claim 1 further comprising an optical character recognition means for resolving printed information appearing on the face of said check.

8. The system for efficiently processing check-initiated financial transactions via electronic funds transfer as claimed in claim 7, wherein said optical character recognition means is built into said point of identification terminal.

9. The system for efficiently processing check-initiated financial transactions via electronic funds transfer as claimed in claim 7, wherein said optical character recognition means is located at said remote database site.

10. The system for efficiently processing check-initiated financial transactions via electronic funds transfer as claimed in claim 1, wherein said means of communication comprises a point of verification modem communicating with a modem located at one of said remote database sites over a data flow path.

11. The system for efficiently processing check-initiated financial transactions via electronic funds transfer as claimed in claim 10, wherein said data flow path comprises public access telephone lines.

12. The system for efficiently processing check-initiated financial transactions via electronic funds transfer as claimed in claim 10, wherein said data flow path comprises a dedicated wide area network.

13. The system for efficiently processing check-initiated financial transactions via electronic funds transfer as claimed in claim 10, wherein said data flow path comprises a satellite communications link.

14. A method of correlating, storing and retrieving identifying information and financial information to facilitate the processing of check-initiated financial transactions via electronic funds transfer, said method comprising the steps of:

accepting a check from a tenderer as the form of payment for a financial transaction, said check having a checking account number included thereon, which checking account number represents the checking account from which funds required to complete said check-initiated financial transaction will be drawn;

inputting said checking account number into a point of identification terminal;

establishing communications between said terminal and a remote correlation database site, said database site having stored therein a database comprising a plurality of identifying information units, at least one of said identifying information units corresponding to at least one authorized user of said checking account;

verifying that said terminal is authorized to access said remote correlation database site;

transmitting said checking account number from said terminal to said remote database site over a communications means;

retrieving at least one of said identifying information units corresponding to said checking account number transmitted to said remote correlation database site;

transmitting said identifying information unit over said communications means to said point of identification terminal;

displaying said identifying information unit received from said database site on a display means located at said point of identification terminal;

comparing said displayed identifying information unit with characteristics of said person tendering said check;

inputting identifier specific data into said point of identification terminal to indicate that the identifier has compared the displayed identifying information with the characteristics of the person tendering said check;

transmitting said identifier specific data to said remote correlation database site; and storing said identifying information, said identifier specific data and transaction data as a transaction record for recall should a transaction be questioned at a later date.

15. The method of efficiently processing check-initiated financial transactions via electronic funds transfer of claim 14, wherein said identifying information unit comprises the name and address of at least one authorized user of said checking account.

16. The method of efficiently processing check-initiated financial transactions via electronic funds transfer of claim 15, wherein said identifying information unit further comprises a digital photographic image of at least one authorized user of said checking account.

17. A method of correlating, storing and retrieving identifying information and financial information to facilitate the processing of a check-initiated financial transaction via electronic funds transfer, said method comprising the steps of: accepting a check at a transaction site as payment for a financial transaction, said check containing a unique checking account number and at least one identifying information unit capable of identifying the tenderer of said check; communicating said checking account number to a remote correlation database; mapping said checking account number at said database to at least one identifying information unit corresponding to at least one authorized user of said checking account; transmitting said at least one identifying information unit mapped by said remote database to said transaction site; comparing said at least one identifying information unit received from said remote database with said identifying information unit included on said check; indicating that the tenderer of said check is an authorized user of said checking account by selecting the identifying information unit received from the remote database that matches the identifying information unit included on said check; logging said matched identifying information unit at said remote database site for recovery should said financial transaction fail; and returning said check to said tenderer.

18. The method of efficiently processing a check-initiated financial transaction via electronic funds transfer of claim 17, wherein said identifying information unit included on said check, which is matched with said identifying information unit received from said remote database comprises a name and address of each authorized user of said checking account.

19. The method of efficiently processing a check-initiated financial transaction via electronic funds transfer of claim 17, further comprising requesting a transaction record should a check-initiated electronic funds transfer transaction fail, receiving said transaction record and continuing the processing of the financial transaction by contacting said check tenderer and requesting an alternative form of payment.

* * * * *